United States Patent [19]

Kamimura et al.

[11] Patent Number: 5,187,662
[45] Date of Patent: Feb. 16, 1993

[54] STEERING CONTROL SYSTEM FOR MOVING VEHICLE

[75] Inventors: Kenji Kamimura; Sadachika Tsuzuki; Kazunori Noda, all of Saitama, Japan

[73] Assignee: Honda Giken Kogyo Kabushiki Kaisha, Tokyo, Japan

[21] Appl. No.: 644,497

[22] Filed: Jan. 23, 1991

[30] Foreign Application Priority Data

Jan. 24, 1990 [JP] Japan ................................. 2-12424
Jan. 31, 1990 [JP] Japan ................................. 2-19293

[51] Int. Cl.⁵ .......................................... G06F 15/50
[52] U.S. Cl. .............................. 364/424.02; 180/167; 318/568.12
[58] Field of Search ................... 364/424.02, 443, 449, 364/424.01; 180/167-169; 318/587, 568.12

[56] References Cited

U.S. PATENT DOCUMENTS

| | | | |
|---|---|---|---|
| 4,309,758 | 1/1982 | Halsall et al. | 364/424.02 |
| 4,328,545 | 5/1982 | Halsall et al. | 364/424.02 |
| 4,700,301 | 10/1987 | Duke | 364/424.02 |
| 4,710,020 | 12/1987 | Maddox et al. | 356/1 |
| 4,796,198 | 1/1989 | Boultinghouse et al. | 364/424.02 |
| 4,817,000 | 3/1989 | Eberhardt | 364/443 |
| 4,829,442 | 5/1989 | Kadonoff et al. | 364/449 |
| 4,846,297 | 7/1989 | Field et al. | 180/169 |
| 4,858,132 | 8/1989 | Holmguist | 364/424.02 |
| 4,947,094 | 8/1990 | Dyer et al. | 318/587 |
| 4,947,324 | 8/1990 | Kamimura et al. | 364/424.02 |
| 4,994,970 | 2/1991 | Noji et al. | 364/424.02 |
| 5,008,557 | 4/1991 | Noji et al. | 250/561 |
| 5,014,204 | 5/1991 | Kamimura et al. | 364/449 |
| 5,019,990 | 5/1991 | Kamimura et al. | 364/449 |
| 5,025,377 | 6/1991 | Kamimura et al. | 364/424.02 |
| 5,031,101 | 7/1991 | Kamimura et al. | 364/424.02 |
| 5,031,103 | 7/1991 | Kamimura et al. | 364/449 |

Primary Examiner—Thomas G. Black
Attorney, Agent, or Firm—Pollock, VandeSande & Priddy

[57] ABSTRACT

A position detecting system of a moving vehicle wherein a light beam scanned around the vehicle to be reflected by reference retroreflective means is received on the vehicle, the azimuth of each retroreflective means to be detected in the next scan is predicted, the azimuth of a particular incident light which forms the smallest angle with the predicted azimuth and is detected between two reference point discrimination azimuths preset at both sides of the predicted azimuth is judges to be that of an expected reflecting means and utilized for the position detection of the moving vehicle. When the expected retroreflective means is missed in a turning course, a previously known included angle which is formed by two straight lines connecting a turn center to said missing retroreflective means and another retroreflective means disposed just before, respectively, is added to the azimuth of the another retroreflective means in the next scan, and the resultant sum angle is used as the azimuth for the missing retroreflective means.

12 Claims, 12 Drawing Sheets

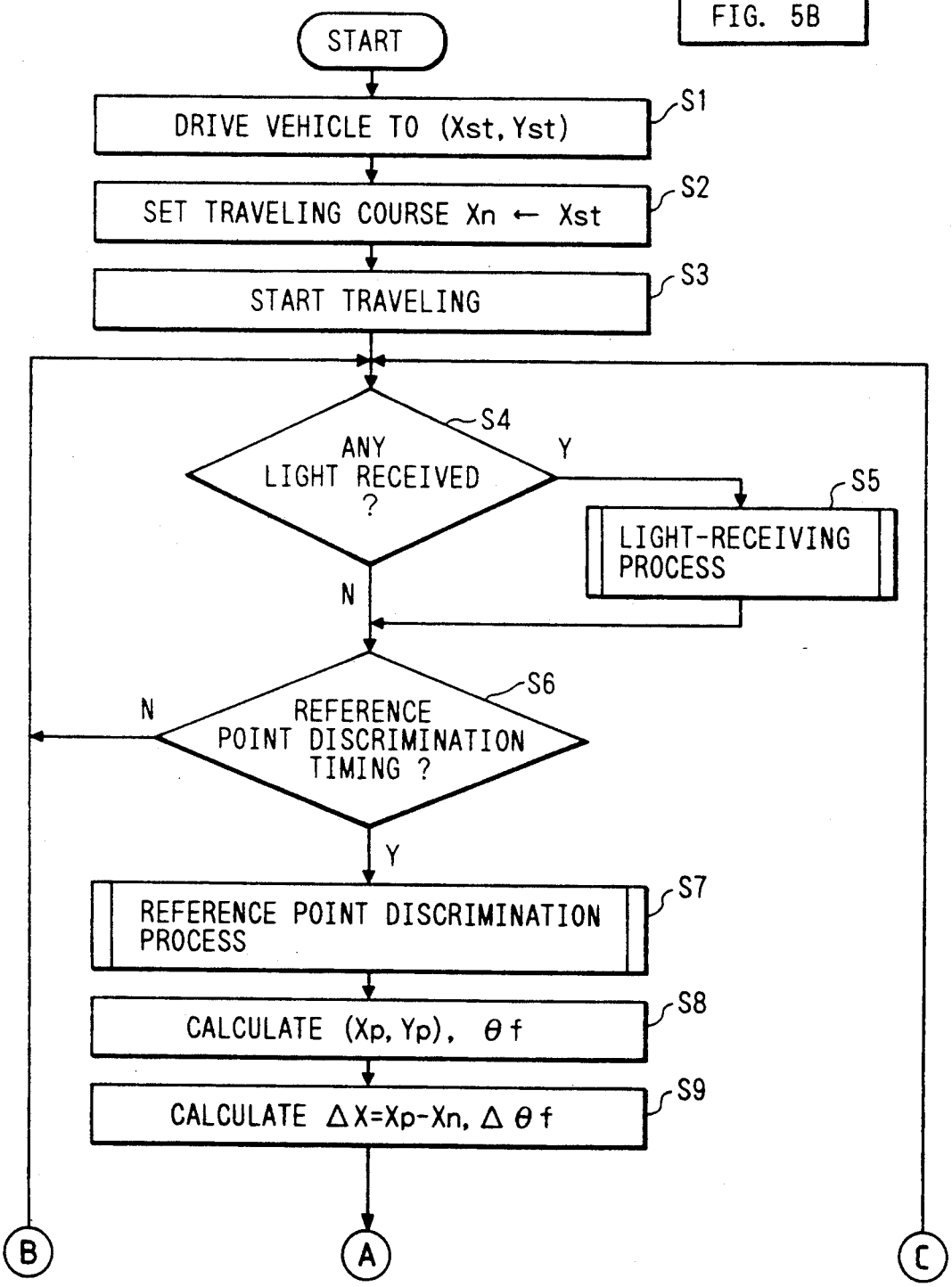

STEERING CONTROL SYSTEM FOR MOVING VEHICLE

BACKGROUND OF THE INVENTION

1. Field of the Invention

The present invention relates to a steering control system for use in a moving vehicle, and more particularly to a steering control system for use in a moving vehicle such as a moving automobile, an unmanned mobile and carrying device in a factory, or an automated vehicle for use in agriculture, civil engineering machinery and the like.

2. Description of the Prior Art

Heretofore, as a system for detecting the current position of a moving body such as one of the moving vehicles described above, there has been proposed a system provided with a means for scanning a light beam emitted from the moving body in the circumferential direction or every azimuthal directions around the moving body, retroreflective means for reflecting to return the light beam in the direction of incident light which are secured at at least three positions apart from the moving body, and a beam receiver means for receiving light reflected from the retroreflective means (Japanese Patent Laid-open No. 67476/1984).

In the above mentioned prior art, differential azimuths between adjoining two of three retroreflective means around the moving body, or included angles formed by the adjoining two of three retroreflective means with the moving body are detected on the basis of received beam output of the light-receiving means, and the position of the moving body is calculated based on the detected differential azimuths and positional information of the retroreflective means which have been previously set.

In the above described system, however, there has been instances where the light beam emitted from a beam source mounted on the moving vehicle could not be directed to the retroreflective means positioned at reference points because of an inclination or vibration of the moving vehicle, or where the light-receiving means on the moving vehicle receives light reflected from objects other than the expected retroreflective means.

When real reflected light is not positively received by a light-receiving means, the position of the moving vehicle is erroneously calculated so that the moving vehicle cannot be traveled along a prescribed course.

Meanwhile, there has been proposed a method for detecting positions of the moving body which is so arranged that the scanning rate and scanning angle of the light beam are allowed to change, thereby positively directing the light beam to the retroreflective means; for example, Japanese Patent Laid-open No. 104503/1984. Furthermore, Japanese Patent Laid-open No. 211816/1984 proposes a system for detecting positions of the moving body which is so arranged that incident light produced on the moving body is converted into intermittent and periodical light, whereby the reflected incident light is discriminate from the light emitted from another light source.

In contrast to those, when retroreflective means are set in four positions, even if one of them is temporarily missed, the position of the moving body can be calculated on the basis of the positions of the remaining three retroreflective means and the direction of the missing retroreflective means can be reversely calculated from the calculated result (U.S. Patent application Ser. No. 454,824 now U.S. Pat. No. 5,019,990).

In addition, if retroreflective means are set only in three positions, it is also possible that, based on the data of the light-receiving direction of the retroreflective means detected in the previous scan cycles, the light-receiving direction in which the retroreflective means is to be detected during the next cycle is predicted, and the received light signal detected in the predicted direction is discriminated from the reflected lights from other objects and judged to be the light from the expected retroreflective means. According to this method, if no received light signal is detected in the predicted direction, the problem due to temporary missing of retroreflective means can be solved by directly using the predicted direction as the reflected light from the expected retroreflective means for the calculation of the self-position of the moving vehicle.

The above mentioned prior arts involve such problems that the system constructions become complicated, for example, the prior method which changes the scanning rate and angle of the light beam is required to vary frequently driving current in an optical scanner, and the prior system which is adapted to produce intermittent and periodical incident light is required to provide a complicated beam source section for producing the incident light.

In either prior art, there has been such a further problem that the position of the moving vehicle cannot be detected where there are troubles in a photosensor system such as a light-receiving means and retroreflective means, or where there are troubles in a rotary table driving section for revolving the photosensor system such as the light-receiving means and the like, or where some or all of the retroreflective means from which the reference signals used for calculation have tilted over.

Furthermore, there has been such a problem that the reflected light cannot be positively received by a moving vehicle because of contamination on a reflecting surface of retroreflective means, or the unexpected appearance of an obstruction when a person or other substance goes across the retroreflective means, as well as obstacles due to inclination or vibration of the moving vehicle. In this respect, these problems as mentioned above could not have been solved by only the above described prior arts.

If the moving vehicle is traveling in a straight line the problem of temporary missing of retroreflective means can be overcome by the above described prior art. However, if the moving vehicle is traveling on a course consisting of straight traveling courses and turning courses contiguous thereto and perform a planned work, there are the following problems.

First, since the direction of the retroreflective means is detected as an azimuth based on a predetermined reference line, for instance, the advance direction of the moving vehicle, the self-position of the moving vehicle can not be accurately calculated on the basis of the azimuth in the turning courses where the advance direction of the moving vehicle largely and quickly changes.

Second, since the rate of change in azimuth is large, if a retroreflective means has been missed, the calculation error undesirably becomes too great in the approach in which, based on the azimuth (direction) having been predicted in the latest detection cycle on the basis of the azimuth detected in the past, the azimuth in which the retroreflective means is to be detected in the current cycle is further predicted.

Accordingly, hitherto, in a turning course, the moving vehicle travels with the steering angle being fixed, and the fixing of the steering angle is released when the azimuth of the retroreflective means substantially coincide with a predetermined value and a straight traveling course is entered. However, once a retroreflective means has been missed, the reflected light from the retroreflective means would have largely changed in direction from the last azimuth even if it is detected again in the next scan cycle, and thus it is difficult to discriminate it from other incident lights from other objects and to accurately obtain, by relying on the azimuth, the timing for releasing the fixing of the steering angle to enter a straight traveling course. Consequently, counter measures for the missing of retroreflective means often needed to be taken also in a turning course, but application of only the above-mentioned prior art as the counter measures has been insufficient.

SUMMARY OF THE INVENTION

It is an object of the present invention to overcome the problems of the prior art and provide a system for detecting the position of a moving vehicle wherein, even if a reflecting means as a reference point for position detection is temporarily missed, a suitable action can be taken so that the moving vehicle does not travel in a wrong direction.

It is another object of the present invention to provide a steering control system for a moving vehicle to cause the moving vehicle to travel along a predetermined course even if a reflecting means is temporarily missed in a turning course.

The first characteristic feature of the present invention resides in a system for detecting the position of a moving vehicle wherein a light beam is scanned in the circumferential direction around the moving vehicle and the reflected light of the light beam from retroreflective means disposed at at least three reference points is received and detected to detect the position of the moving vehicle, comprising means for detecting the azimuth of each retroreflective means as viewed from the moving vehicle on the basis of the received light signal of the reflected light, means for predicting the azimuth of the retroreflective means to be detected in the next scan on the basis of the azimuths which have been detected, means for discriminating and judging the retroreflective means at each direction in which the light beam scan has advanced by a predetermined angle beyond the predicted azimuth, and means for detecting a particular incident light which forms the smallest angle with the predicted azimuth out of the incident lights which have been detected between adjoining two discrimination and judgment directions, the received light signal of the detected incident light being judged to be that from the expected reflecting means, and the azimuth of the reflecting means calculated on the basis of the received light signal being utilized for the position detection of the moving vehicle.

The second characteristic feature of the present invention resides in that a discrimination angle range based on the predicted azimuth is provided, and when the incident light from the direction nearest the predicted azimuth is in the discrimination angle range, the received signal of the incident light is judged to be that from the expected reflecting means, and the azimuth of the reflecting means calculated on the basis of the received light signal is used for the position detection of the moving vehicle.

Moreover, the third characteristic feature of the present invention resides in that, if an incident light which can be judged to be the light reflected by the expected reflecting means is not detected in the construction having the first or second characteristic feature, the predicted azimuth is used for the position detection of the moving vehicle.

Further, the present invention is characterized by including means for predicting an azimuth on the basis of the azimuths of the detected retroreflective means in which azimuth the retroreflective means is to be detected in the next scan, and means for setting the included angle formed by adjoining two of the straight lines which connect each turn center in a previously established traveling course of the moving vehicle to the respective retroreflective means, and by being constructed so that, if the expected retroreflective means is not detected in the predicted azimuth in a turning course, the included angle formed by two straight lines connecting, respectively, a retroreflective means which has not been detected and another retroreflective means disposed just before the scan direction thereof to the turn center is added to the azimuth of the retroreflective means disposed just before the scan direction which will be determined in the next scan, and the resultant sum angle is used as the azimuth in which the undetected retroreflective means is to be detected in the next scan.

Paying attention to the fact that the included angle formed by the mutually adjoining two straight lines which connect the turn center of the moving vehicle in a predetermined traveling course to two respective retroreflective means can be precalculated based on the positional informations of the turn center and the reference points, and that the included angle formed by two reference points of retroreflective means with the position of the moving vehicle which is turning does not change with so large a rate since the moving vehicle turns without largely deviating from the predetermined turn center in an actual work, the present invention employs the included angle for temporarily predicting the azimuth of the undetected reflecting means.

In accordance with the present invention, even if retroreflective means is temporarily missed in the turning course, the azimuth of the missing retroreflective means to be detected in the next scan can be predicted with an accuracy sufficient for practical use, and consequently the missing retroreflective means can be detected on the basis of the predicted azimuth without an error.

BRIEF DESCRIPTION OF THE DRAWINGS

FIGS. 5A and 5B show a flowchart of steering control for a moving vehicle;

FIG. 5 shows the relationship between the flowcharts of FIG. 5A and 5B.

DETAILED DESCRIPTION OF THE PREFERRED EMBODIMENTS

Figure 13:
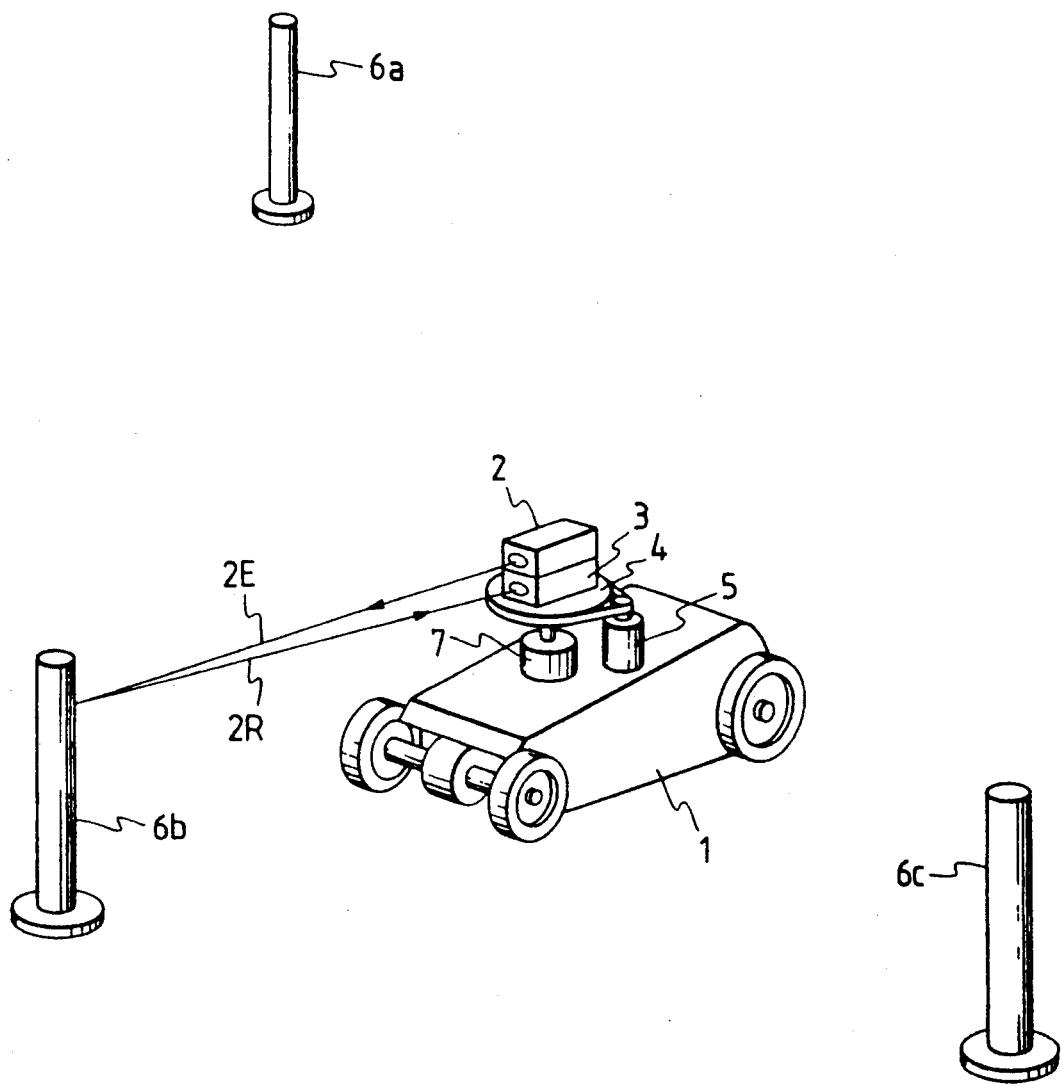
FIG. 13 is a perspective view showing the arrangement of the moving vehicle and the reflectors.

An embodiment of the present invention will be described hereinbelow by referring to the accompanying drawings. FIG. 13 is a perspective view showing a moving vehicle carrying the control system according to the present invention and light reflectors disposed in an area in which the moving vehicle travels.

In FIG. 13, the moving vehicle 1 is one for use in agricultural working such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving light 2R reflected by each of the retroreflectors 6a-6c for reflecting the light beam 2E. The beam source 2 is provided with a light beam emitting means (light-emitting diode) and the beam receiver 3 is provided with a means (photo-diode) for receiving incident light to convert it into an electrical signal (both of them are not shown). Furthermore a rotary encoder 7 is disposed so as to be interlocked with a drive shaft of the rotating table 4, so that when pulses output from the rotary encoder 7 are counted, the turning angle of the rotating table 4 can be detected. The retroreflectors 6a-6c are located around a working area of the moving vehicle i.

The light beam 2E generated in the light beam source 2 is scanned, for instance, in the counterclockwise direction, the lights 2R reflected by reflectors 6a-6c are detected by the light beam receiver 3 in the order of the reflected lights from reflectors 6a, 6b and 6c, and the self-position of the moving vehicle I in regard to reflectors 6a-6c is determined on the basis of the detected signals to perform steering control of the vehicle 1.

In operation, a reflective object or light-emitting object other than the reflectors may exist in the traveling area of the moving vehicle 1 or in the neighborhood thereof and light from the reflective object may be detected in the light beam receiver 3, or it may also be possible that the light reflected by an expected reflector can not be detected. In this embodiment, whether or not the detected light comes from the expected reflector is discriminated by the following process.

Figure 3:
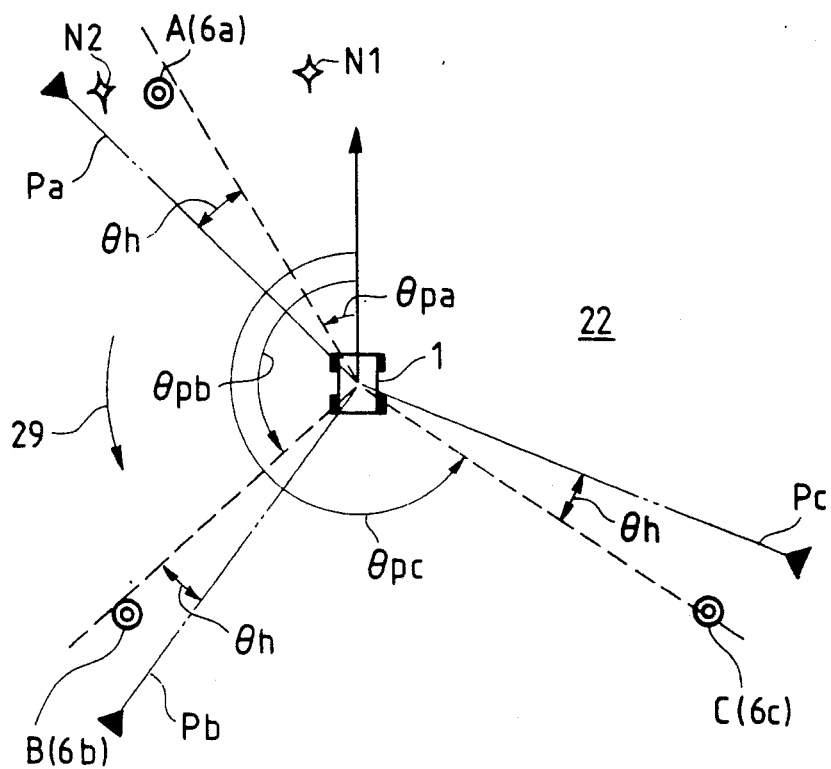
FIG. 3 is a representation for explaining the reference point discrimination process.

FIG. 3 is a representation for explaining the reference point discrimination process. In the same figure, the reflectors 6a-6c are disposed at reference points A-C around work area 22. Arrow 29 represents the scan direction of the light beam emitted from moving vehicle 1.

In the moving vehicle 1, the azimuth of each reference point as seen from the moving vehicle 1 is calculated on the basis of the signal detected by the light beam receiver 3, and the azimuths of the reference points to be detected in the next scan are predicted on the basis of the azimuths which have been detected up to the present time. The predicted azimuths are represented by angles $\theta pa$–$\theta pc$. Reference point discrimination azimuths pa-pc are provided at the respective azimuths which are advanced by an angle $\theta h$ beyond the respective predicted azimuths $\theta pa$–$\theta pc$ in the light beam scan direction. As the scans for the reference point discrimination azimuths pa-pc proceed, the incident light from the direction nearest the predicted azimuth of the lights detected in the horizontal angle range from the preceding reference point discrimination azimuth to the current reference point discrimination azimuth is judged to be the light reflected by the reflector placed at the expected reference point.

For instance, assume that, in the range of the current reference point discrimination azimuth pa and the preceding one pc, three light beams from noise sources N1 and N2 and the reflector 6a disposed at reference point A have been detected. In this case, the light from the direction nearest the predicted azimuth $\theta pa$, namely, the light from reference point A can be discriminated from the others.

The following processing may be added to improve the discrimination precision of reference points. A predetermined extent (an angle equal to or less than the angle $\theta h$), or a limited angle range, is set before and behind a predicted azimuth, and when the light is out of the extent even though the light comes from the direction nearest the predicted azimuth, it is determined that the expected reference point has been missed. When it is determined that the expected reference point has been missed while moving vehicle 1 is traveling on a straight traveling course, the position of moving vehicle 1 in the current process cycle is calculated using the predicted azimuth, and the said predicted azimuth is stored for the next process cycle.

Figure 1:
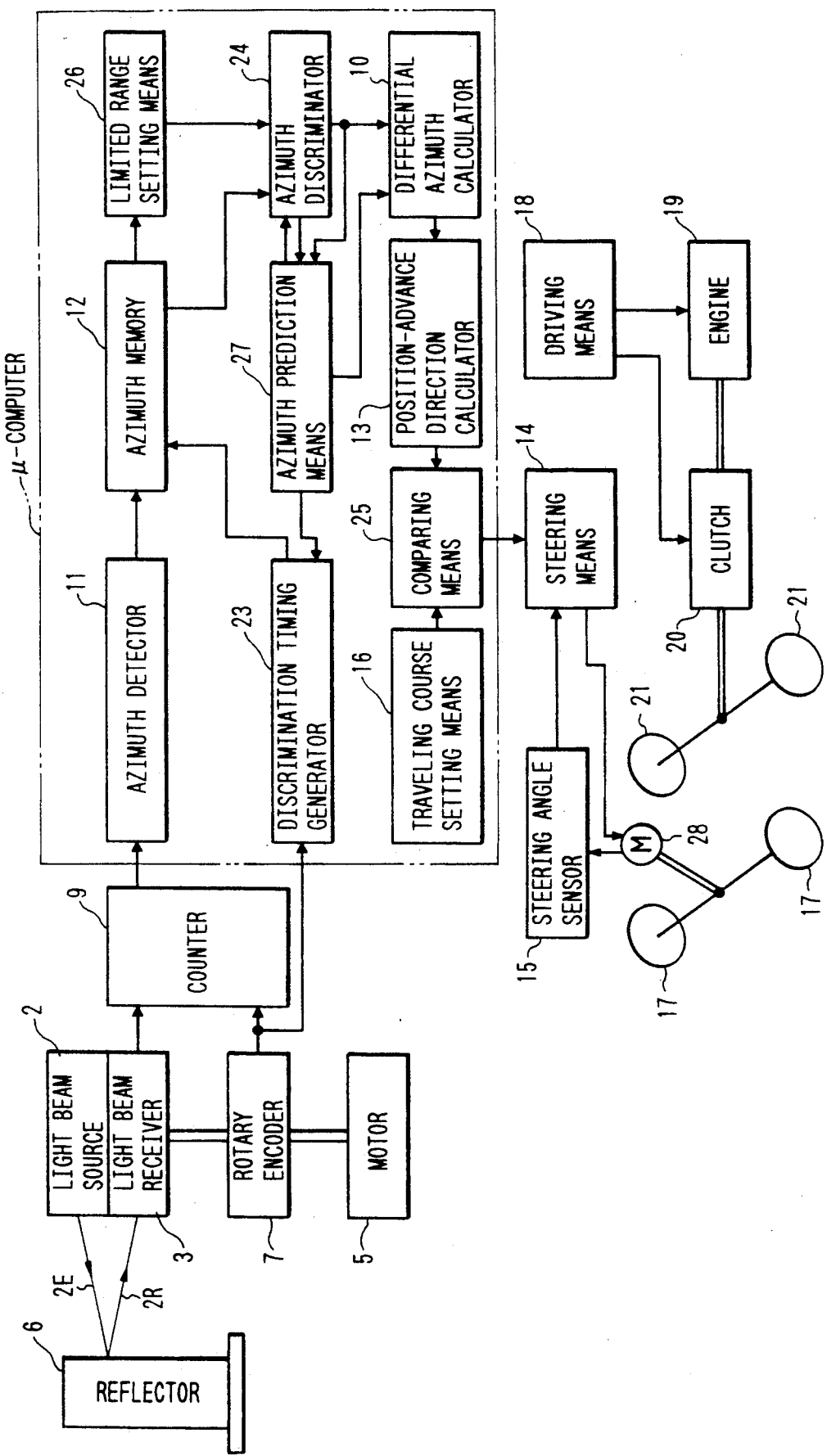
FIGS. 1 and 2 are block diagrams showing the functions of an embodiment of the present invention.

The control function for the vehicle traveling on a straight traveling course is described with reference to FIG. 1. In the same figure, the portion surrounded with a chain line can be constituted of a microcomputer. Light beam 2E emitted from light beam source 2 is scanned in the rotational direction of the rotating table 4 and reflected by reflectors 6 (6a-6c). Light 2R reflected by the reflectors 6a-6c is received at light beam receiver 3. Counter 9 counts the pulses outputted from rotary encoder 7 in conjunction with the rotation of the rotating table 4. The pulse count value is transferred to azimuth detecting means 11 each time light is detected in the light beam receiver 3. In the azimuth detecting means 11, the azimuths of reflectors 6a-6c are calculated on the basis of the supplied pulse count value.

The azimuth detected in the azimuth detecting means 11 is transferred to and stored in azimuth memory means 12, and the data which have so far been accumulated in the azimuth memory means 12 are transferred to azimuth discriminating means 24 in response to the discrimination timing signal supplied from discrimination timing generator means 23. The discrimination timing signal is outputted when the scanning has proceeded to a direction which has passed by a predetermined angle $\theta h$ beyond the direction represented by the predicted azimuth that was calculated in azimuth prediction operating means 27, or when the scanning of the light beam has proceeded to the reference point discrimination azimuths pa-pc, respectively. The discrimination timing generator means 23 outputs a discrimination timing signal when it has taken in the output pulses of the rotary encoder 7 by a predetermined number corresponding to the predicted azimuth calculated in the azimuth prediction operating means 27.

The azimuth discriminating means 24 judges that the light detected in a direction nearest the predicted azimuth calculated in the azimuth prediction operating means 27 of the supplied azimuths is the light reflected by the reflector at the expected reference point. The azimuth data of the reflector determined by the judgment are utilized when the azimuth of the reflector to be detected in the next scan is predicted in the azimuth prediction operating means 27. That is, the predicted azimuth is obtained by an experimentally predetermined function of the azimuths which have been determined in the azimuth discriminating means 24. The method of the obtaining predicted azimuth is not limited to the approach based on the predetermined function, but the predicted azimuth may be obtained by adding the difference between the azimuths obtained in the current and last cycles by the azimuth discriminating means 24 to the current azimuth.

The azimuths detected in the azimuth discriminating means 24 are inputted to a differential azimuth calculating means 10, where each angle defined between the adjoining two retroflectors 6a-6c, respectively, viewed from the moving vehicle 1, i.e., a differential azimuth is calculated.

In a position-advance direction calculating means 13, a current position coordinate of the moving vehicle 1 is calculated on the basis of the detected differential azimuths, so that the advance direction of the moving vehicle 1 is calculated based on the azimuths. The results of the calculation are inputted to a comparing means 25. In the comparing means 25, data indicating a traveling course set in a traveling course setting means 16 are compared, respectively, with the coordinates and the advance direction of the moving vehicle 1 obtained in the position-advance direction calculating means 13.

In the steering means 14, a steering motor (M) 28 connected to front wheels 17 of the moving vehicle is driven on the basis of the comparison results. An angle of steering for the front wheels 17 driven by the steering motor 28 is detected by means of a steering angle sensor 15 mounted on the front wheels of the moving vehicle 1, and fed back to the steering means 14. A driving means 18 controls starting and stopping of the vehicle engine 19 as well as operation of a clutch 20 for transmitting the power of the engine 19 to rear wheels 21.

To increase the discrimination accuracy of a reference point, a function is added for supplying the limited angle range preset in range setting means 26 to the azimuth discriminating means 24, and discriminating whether or not the light detected in the direction nearest the predicted azimuth is in the preset limited angle range. As a result of the discrimination by the discriminating function, if the light detected in the direction nearest the predicted azimuth is judged to be in the preset limited range, the differential azimuth is calculated using this azimuth, while if it is out of the preset limited range, the differential azimuth is calculated using the predicted azimuth calculated in the azimuth prediction operating means 27. It may optionally be selected depending on the degree of accuracy required in the system, according to the mode or type of the work by the moving vehicle 1, whether only the light within the limited angle range preset in the range setting means 26 is judged to be the light reflected by the expected reference point and the differential azimuth is calculated using the azimuth of the incident light, or the differential azimuth is calculated using the azimuth which has been determined without judgment as to whether or not the azimuth of the incident light is in the limited range preset in the range setting means 26.

A fundamental principle for detecting the position and the advance direction of the moving vehicle 1 will be described hereinbelow in accordance with the present embodiment having the above described construction.

Figure 11:
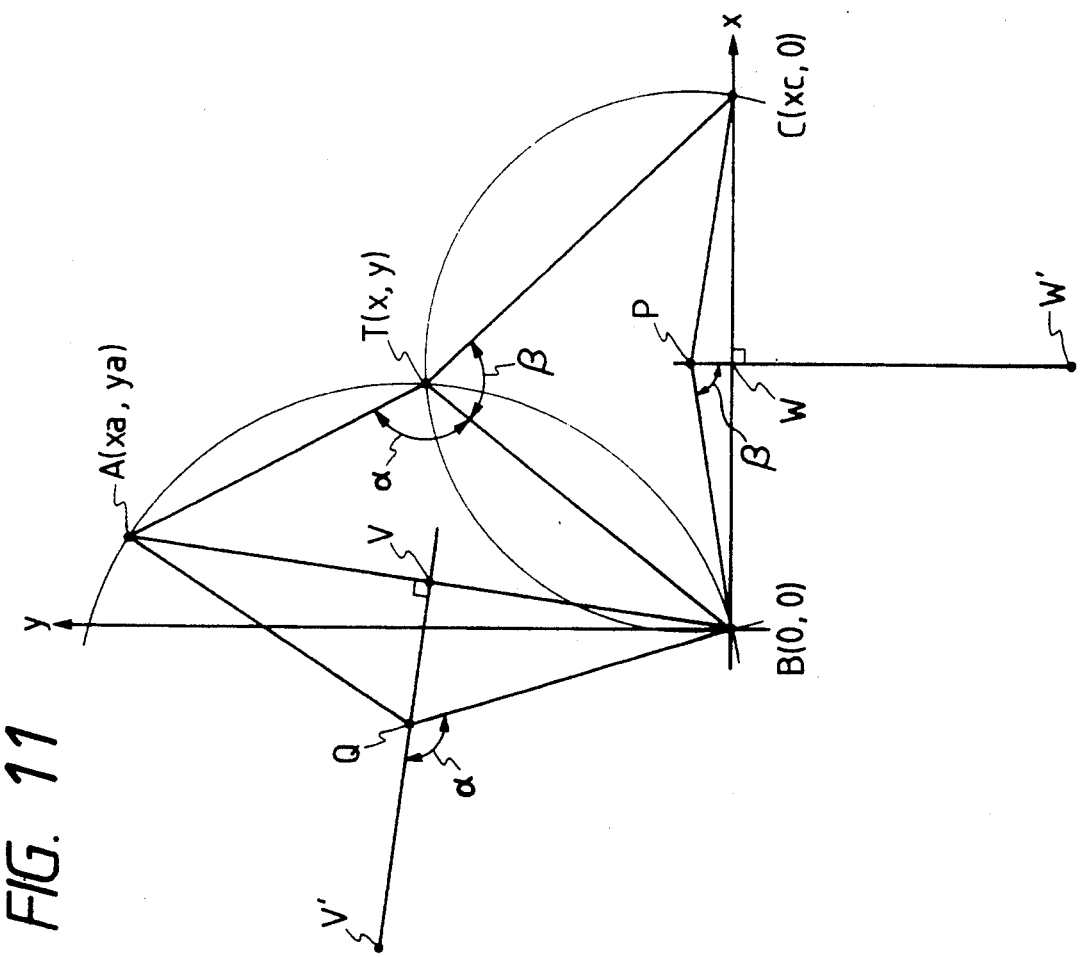
FIG. 11 is a representation for explaining the principle of detecting the position of the moving vehicle.
Figure 12:
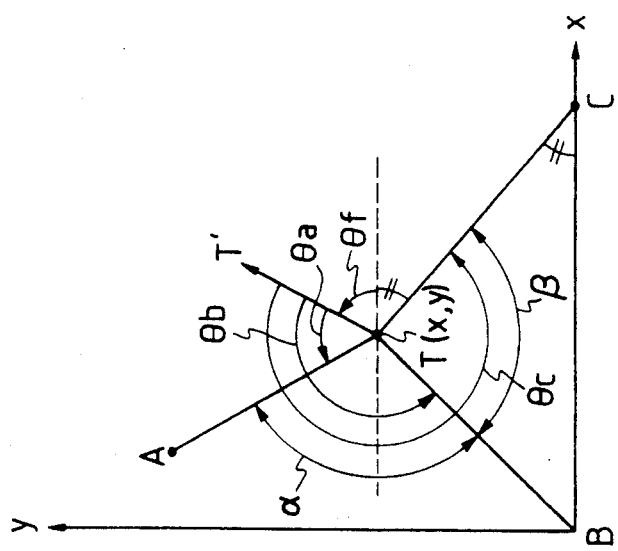
FIG. 12 is a representation for explaining the principle of detecting the advance direction of the moving vehicle.

FIGS. 11 and 12 are explanatory graphical representations each showing the position T of the moving vehicle I and those of the reflectors 6 in a coordinate system for indicating the working area Of the moving vehicle 1.

In these figures, positions of the reflectors 6a-6c are indicated by points A, B and C (hereinafter referred to as "reference points A, B and C"). The positions of the reference points and the vehicle 1 are represented by an x-y coordinate system wherein the reference point B is the origin, and a line extending between the reference points B and C is the x-axis. The current position of the moving vehicle 1 is T(x, y) and its advance direction with respect to the x-axis is $\theta f$. As is apparent from FIG. 11, the position T of the moving vehicle is on a first circumscribed circle Q for a triangle ATB as well as a second circumscribed circle for a triangle BTC. Accordingly, when two points of intersection of the two circumscribed circles Q and P for the triangles ATB and BTC are calculated, the position of the moving vehicle 1 is fixed. In this case, since the reflector 6b is the origin, the other intersection T of the two circumscribed circles P and Q is calculated in accordance with an appropriate procedure so that the position of the moving vehicle 1 is found. The fundamental principle and the calculation equations are fully described in U.S. Pat. application Ser. Nos. 344,574 and 362,630 now, respectively, U.S. Pat. No. 5,011,288 and No. 4,947,324.

Furthermore, the advance direction Of the moving vehicle 1 is calculated as follows. In FIG. 12, assuming that the angle between the advance direction TT' of the moving vehicle 1 and the x-axis is $\theta f$, and the differential azimuths of the reference points A, B and C with respect to the advance direction TT' as reference are, respectively, $\theta a$, $\theta b$ and $\theta c$, it gives the following equation, $$\theta f = 360° - \tan^{-1}\{y/(xc-x)\} - \theta c \qquad (1)$$

The position T and the advance direction T' of the vehicle 1 is calculated in the position-advance direction calculation means 13.

Figure 5B:
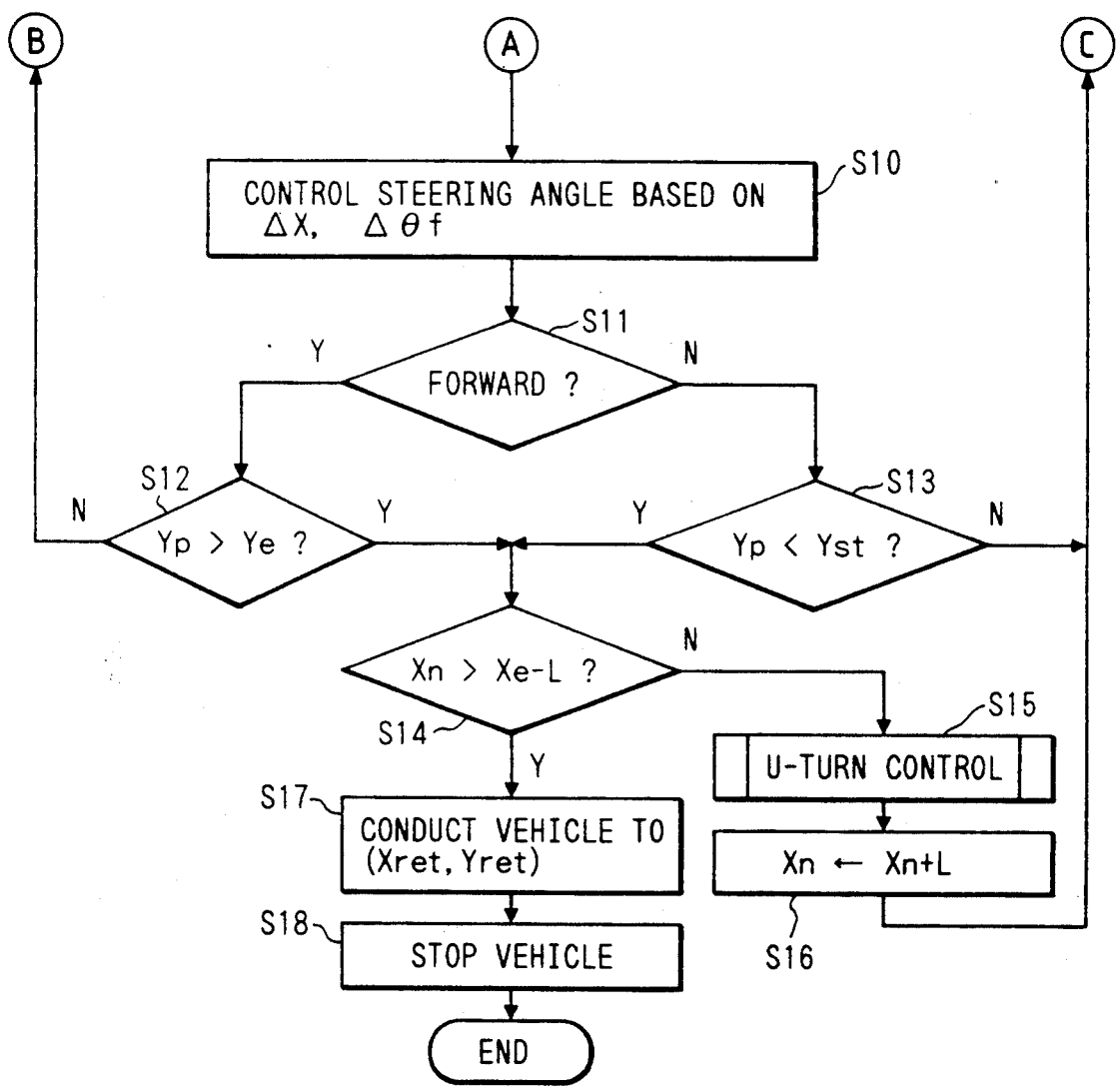
Figure 10:
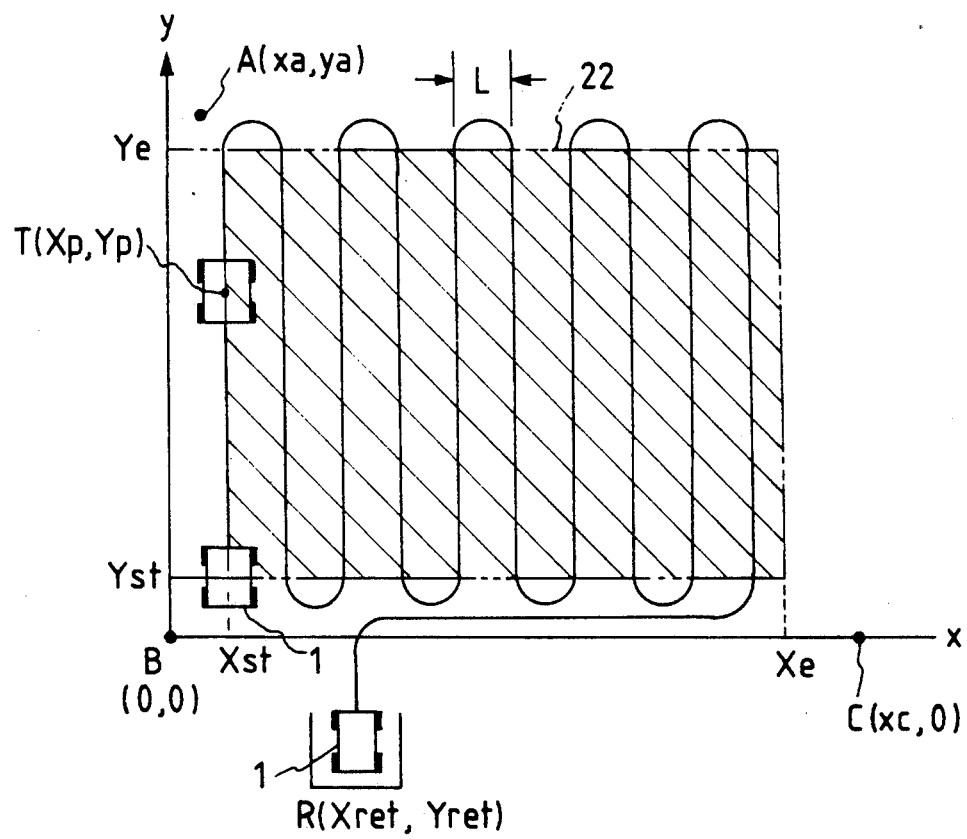
FIG. 10 is a representation showing the arrangement of the traveling course of the moving vehicle and the reflectors.

Next, steering control for the moving vehicle 1 will be described hereinbelow. FIG. 10 is a schematic diagram showing a traveling course of the moving vehicle 1 and the coordinates of the reference points A, B and C, and FIG. 5 is a flowchart illustrating a procedure for steering control. The current position T and the working area 22 of the moving vehicle 1 are represented by such a coordinate system as shown in FIG. 11. (Xret, Yret) indicate coordinates of a returning position R of the moving vehicle 1, and the working area 22 is a quadrilateral region including four apexes of the points represented by four coordinates (Xst, Yst), (Xst, Ye), (Xe, Yst) and (Xe, Ye). In this case, the current position of the moving vehicle 1 is represented by T(Xp, Yp).

For simplifying the explanation, while an example wherein four sides of the working area 22 are parallel to x- or y-axes is shown in FIG. 10, other directions and/or shapes of the working area may be selected so long as the points A–C are disposed around the working area 22.

In accordance with the flowchart shown in FIG. 5, a control procedure will be described hereinbelow in which it is assumed that the moving vehicle 1 reciprocates in parallel to the y-axis as in the traveling locus of FIG. 10, and the pitch between adjacent reciprocations is L.

First of all, in step S1, the moving vehicle 1 is transferred by means of, for example, radio control from point R to a position where working is started.

In step S2, Xst is set as an X-coordinate Xn for a traveling course thereby to fix the traveling course. Traveling of the moving vehicle 1 is started in step S3.

It is judged in step S4 whether or not light which is reflected by any reference point or a light from another light source is received by the beam receiver 3. When light is detected, the operation proceeds to step S5, and a light-receiving process which will be described hereinafter is carried out. When no reflected light is detected, the operation proceeds to step S6.

In step S6, a judgment is made as to whether or not it is the time for performing a reference point discrimination process determining which one of the received lights is light from the expected reference point. This judgment is made depending on whether or not the scan has proceeded to one of the reference point discrimination directions pa-pd which are set to advance by the angle $\theta h$ beyond each of the predicted azimuths $\theta pa$-$\theta pd$ that are calculated in the azimuth prediction calculating means 27.

Steps S4-S6 are repeated until the judgment in step S6 becomes positive, and if the judgment is positive, the precessing goes to Step S7 where the reference point discrimination process is performed as shown in a later described subroutine. If the azimuth of the expected reference point has been determined by the reference point discrimination process, step S8 is entered.

The present position (Xp, Yp) and an advance direction $\theta f$ of the moving vehicle 1 is calculated in step S8.

In step S9, a deviation amount of the traveling course ($\Delta X = Xp - Xn$, $\Delta\theta f$) is calculated, and a steering angle is controlled in step S10 by the steering means 14 in response to the amount of deviation calculated.

In step S11, it is judged whether the moving vehicle 1 is traveling away from the origin (forward direction) or us approaching the origin (reverse direction) in the y-axial direction. In the case of forward direction, it is judged whether one stroke has been finished (Yp>Ye) or not in step S11, while in case of reverse direction, it is judged whether one stroke has been finished (Yp<Yst) or not in step S13. When it is judged that one stroke has not been finished in either step S12 or step Si, the process returns to steps S4.

In the case where it is judged that one stroke has been finished in either step S12 or S13, it is judged in the following step S14 whether all the strokes have been finished (Xp>Xe−L) or not.

When all strokes have has not been finished, the procedure shifts from step S14 to step S15 to effect U-turn control of the moving vehicle 1. U-turn control is carried out in accordance with a different method from the one for steering control in a straight traveling course wherein the positional information of the moving vehicle 1 operated by the position-advance direction operating means 13 is fed back to the steering means 14.

More specifically, it is adapted that the vehicle 1 is traveled while fixing a steering angle thereof at a predetermined angle in a turning course, and the moving vehicle returns to steering control in a straight traveling course when at least one of azimuths of the respective reflectors 6 viewed from the vehicle I substantially falls in a predetermined range of corresponding azimuth. The details of U-turn control for traveling the moving vehicle along the turning course will be described later in reference to FIG. 8.

In step S16, a pitch L is added to Xn thereby operating (Xn+L) and the following traveling course is set. When the following traveling course has been set, the procedure returns to step S4 and the above described processings are repeated.

When all strokes are completed, the moving vehicle returns to the return position R(Xret, Yret) in step S17, and the travel thereof stops in step S18.

Now, the light receiving process and the reference point discrimination process of the steps S5 and S7 are described.

Figure 7:
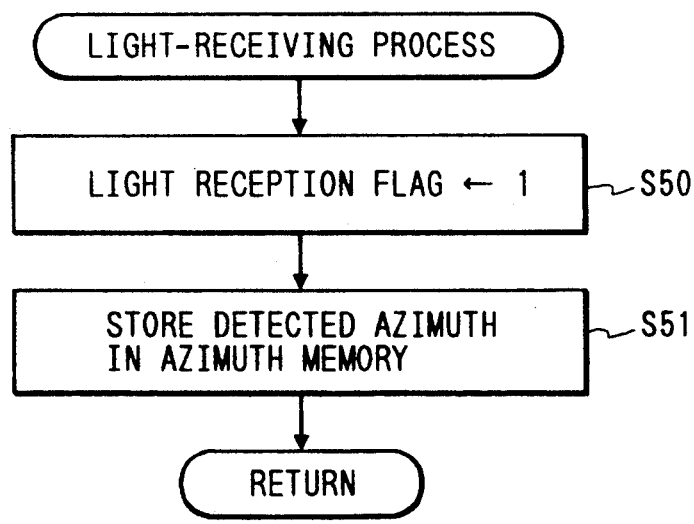
FIG. 7 is a flowchart of the light-receiving process.

The flowchart of the light receiving process is shown in FIG. 7. In step S50, "1;" is set in a light reception flag to memorize the detection of light. In step S51, the azimuth of the source of the detected light is stored in the azimuth memory means 12.

Figure 6:
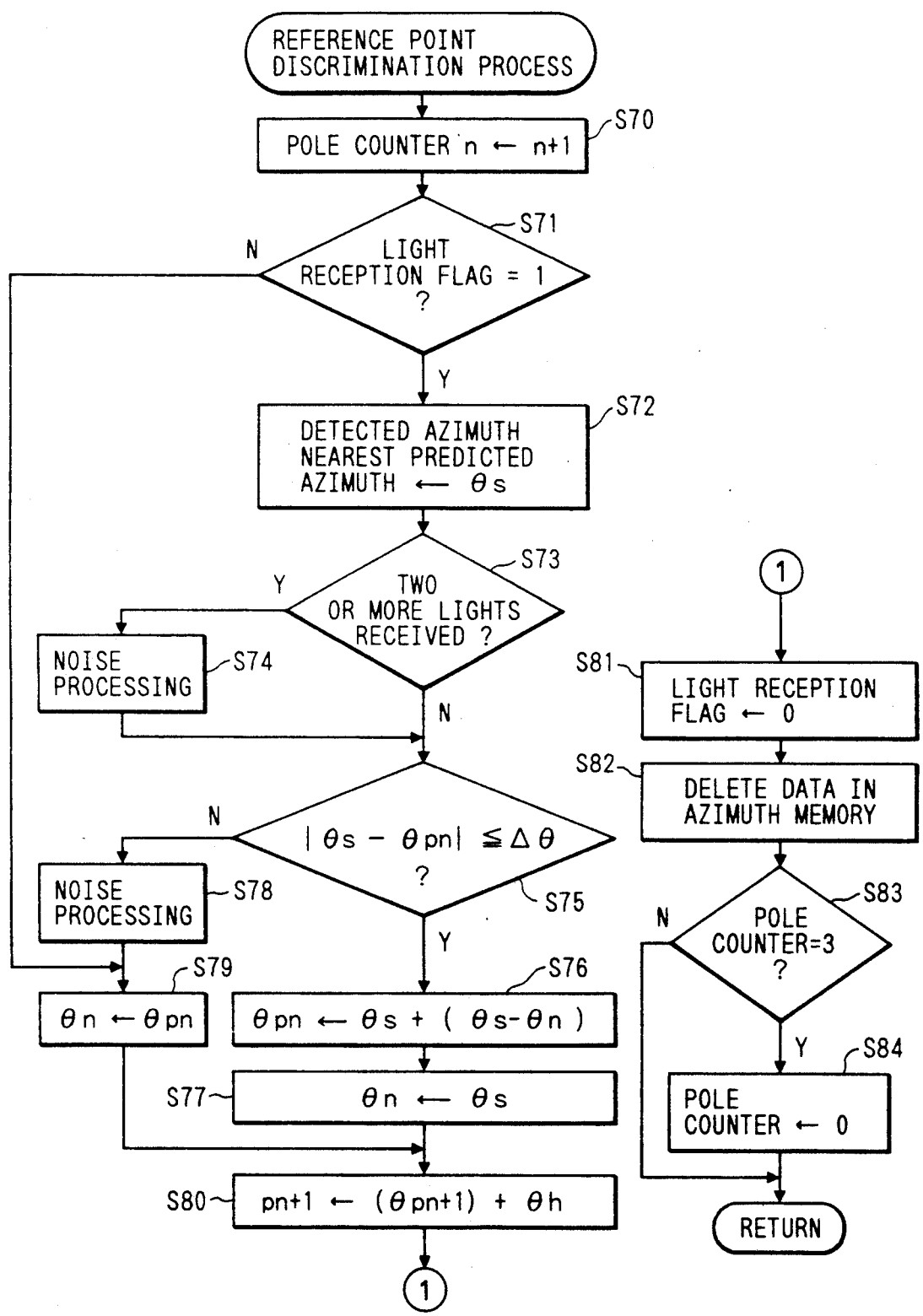
FIG. 6 is a flowchart of the reference point discrimination process.

The flowchart of the reference point discrimination process is shown in FIG. 6 where an example of the procedure is shown for further limiting the detected azimuth nearest the predicted azimuth with the limited angle $\Delta\theta$ preset in the range setting means 26 thereby to more strictly discriminate a reference point.

In step S70, the pole counter value (hereinafter simply referred to as "pole counter") n representing each of the reference points to be discriminated is incremented by one. The pole counters correspond to each of the individual reference points. That is, pole counter "1" corresponds to the reference point A, pole counter "2" the reference point B, and pole counter "3" the reference point C. If the initial value of a pole counter is "0", the pole counter becomes "1" by the processing in step S70, and the reference point corresponding to this value is A. In this embodiment, the initial value is "0".

In step S71, the light reception flag is examined, and the procedure goes to step S72 if the light reception flag is "1" and jumps to step S79 if it is "0". In step S72, out of the azimuths of the light sources which have been detected and stored in the azimuth memory means 12, only the one nearest the predicted azimuth $\theta pn$ ($\theta pa$, because the pole counter is now "1") is presumed to be that of the expected reference point and that value is stored as an angle $\theta s$.

In step S73, the existence of noises is determined by judging whether or not the number of received lights is "2" or more, namely, a plurality of azimuths have been stored in the azimuth memory means 12. If the decision in the step S73 is positive, the process goes to step S74 assuming that at least one noise has been detected, where the detection of a noise is stored as the noise processing. By the stored noise data, a key to knowing the work environment status is obtained later, whereby it is facilitated to take a suitable step such as removal of noise sources.

If the judgment in step S73 is negative, the flow proceeds to step S75, where a judgment is made as to whether or not the difference between the presumed azimuth $\theta$s and the predicted azimuth $\theta$pn (here $\theta$pa) is smaller than the limited angle $\Delta\theta$. If the difference is larger than the angle $\Delta\theta$, it is judged that the presumed azimuth $\theta$s is that of a noise source rather than the expected reference point, and the process goes to step S78 where a noise processing similar to the step S74 is performed. Then, step S79 is entered where the predicted azimuth $\theta$pn ($\theta$pa) is set as the azimuth $\theta$n ($\theta$a) of the expected reference point A in a reference point missing process.

On the other hand, if the difference is smaller than the limited angle $\Delta\theta$ in step S75, it is decided that the presumed azimuth $\theta$s is that of the expected reference A, and step S76 is entered. In step S76, based on the azimuth $\theta$n determined in the last processing and the azimuth $\theta$s determined in the current processing, the predicted azimuth in which the same reference point is to be detected in the next processing is calculated in accordance with the computation formula, $\{\theta s+(\theta s-\theta n)\}$.

In step S77, the azimuth $\theta$n is renewed with the angle $\theta$s. In step S80, a sum angle obtained by adding the predetermined angle $\theta$h to the predicted azimuth $\theta$pn+1 calculated at a time of detecting reference point B in the last scan is set as the next reference point discrimination azimuth pn+1 (in this example, pb).

In step S81, the light reception flag is reset. In step S82, the data stored in the azimuth memory means 12 is deleted. In step S83, it is determined whether or not the pole counter is "3". The value "3" is the total number of reference points in the present example, and this value is preset depending on the total number of the reference points disposed. If the number n of the reference points matches the pole counter, "0" is set in the pole counter in step S84 and control is returned to the main routine shown in FIG. 5.

When the pole counter is "1", the pole counter is incremented to "2" by step S70 in the next processing and the discrimination process of the reference point B is performed. Thereafter, the discrimination process of the reference point C is similarly performed.

As described above, in this embodiment, if a plurality of lights are detected by light beam receiver 3, one of the plurality of lights which comes from a direction nearest the predicted azimuth and does not deviate by more than the limited angle from the predicted azimuth is judged to be light reflected by the expected reference point. In addition, if the expected reference point is missed, the azimuth predicted in the last scan cycle is used for the position detection of moving vehicle 1.

In the present invention, all the lights detected between a pair of adjoining individual reference point discrimination directions may be stored in the azimuth memory means and subjected to the discrimination of reference points.

In the event that an expected reference point is missed in a turning course of the moving vehicle 1, the accumulation of errors becomes too large if the previously predicted azimuth is again used as a predicted azimuth in the next scan cycle, and thus a following discrimination process is performed to avoid said disadvantage.

Figure 4A:
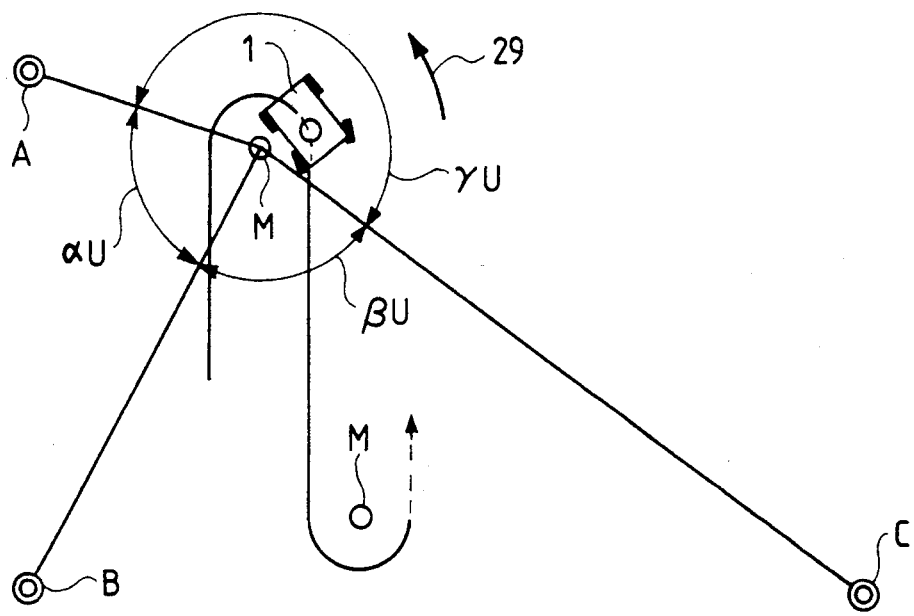
FIGS. 4A and 4B show a representation for explaining the reference point discrimination process in a turning course.
Figure 4B:
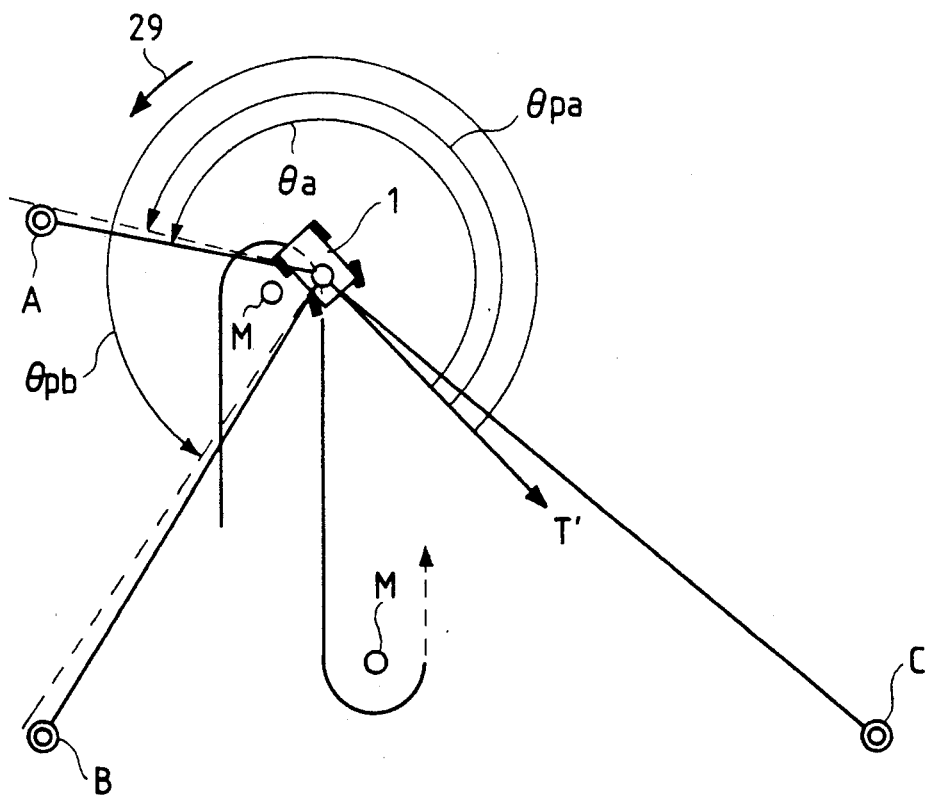

FIG. 4 illustrates the discrimination process in a case where a reference point is missed in a turning course, in which the same symbols as FIG. 3 represent the same or identical portions. The positional information of the reference points A-C is measured and set beforehand, and the included angles $\alpha$U, $\beta$U and $\gamma$U formed by the adjoining two of three straight lines connecting a turn center M of the predetermined traveling course and the individual reference points A-C are previously calculated on the basis of the preset positional informations.

For example, during the scanning of a light beam in the direction of arrow 29 around the moving vehicle 1, if it is judged that reference point A has been missed by a processing described in connection with FIG. 3, then immediately after the reference point C disposed just before the scan direction of the missing reference point A is detected in the next scan, the azimuth $\theta$c of the reference point C and the included angle $\gamma$U are added to obtain a predicted azimuth $\theta$pa in which the reference point A is to be detected in the next scan. If reference point B has been missed, the included angle $\alpha$U is added to the azimuth $\theta$a of reference point A just before it to obtain a predicted azimuth $\theta$pb in which reference point B is to be detected in the next scan. Similarly, a predicted azimuth is obtained for reference point C when it has been missed.

Figure 2:
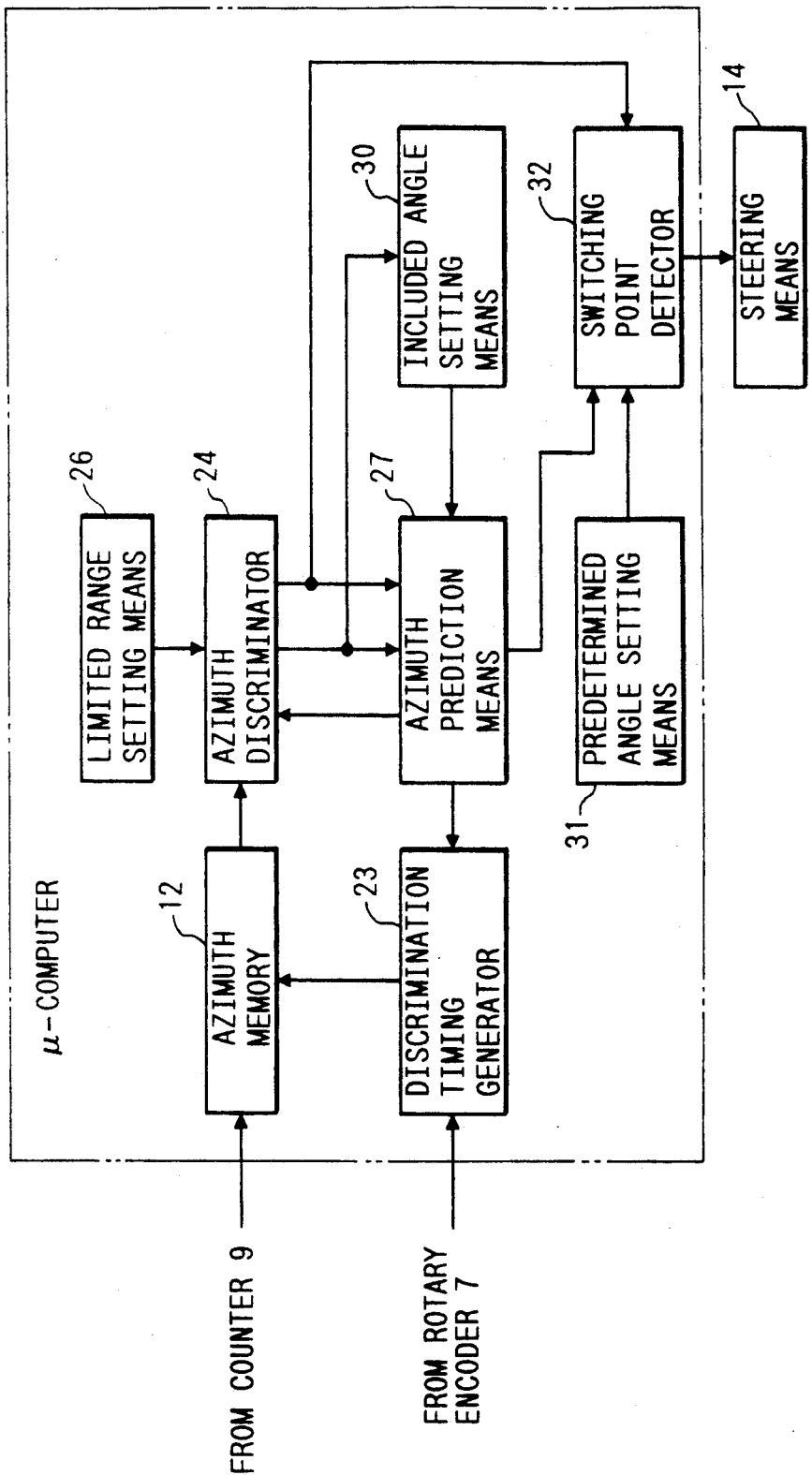

Now, a control device for traveling of the moving vehicle 1 and the reference point discrimination process in a turning course is described according to the block diagram shown in FIG. 2. In the same figure, the same symbols as FIG. 1 represent the same or identical portions.

In the turning course, moving vehicle 1 is made to travel with the steering angle being fixed to a preset value, and if it is detected that at least one azimuth of the respective reference points as seen from the moving vehicle 1 substantially coincide with the preset angle, the fixing of the steering angle is released for allowing the moving vehicle 1 to travel in a straight traveling course. The reference angle for releasing the fixing of the steering angle is set in predetermined angle setting means 31. In the predetermined angle setting means 31, pairs of the predetermined angle and the azimuth of the respective reference points are set corresponding to all the reference points for the left and right turning of moving vehicle 1, respectively.

In switching point detection means 32, either the predicted azimuth provided from the azimuth prediction means 27 when a reference point has been missed or the detected azimuth provided from the azimuth discriminating means 24 is compared with the angle set in predetermined angle setting means 31, and based on the result it is detected that moving vehicle 1 has reached the switching point where a turning course shall change to a straight traveling course. When it is detected that moving vehicle 1 has reached the switching point, a command signal for releasing the fixing of the steering angle is provided from the switching point detection means 32 to the steering means 14. Since specific examples of the predetermined angle computation formula and the detail of the steering control at the switching point of the traveling course are described in U.S. Pat. No. 4,947,324, the explanation thereof is omitted.

If an expected reference point is detected in the azimuth discriminating means 24, the azimuth of the reference point is supplied to the azimuth prediction means 27 and the switching point detection means 32. In the azimuth prediction means 27, the predicted azimuth for the next scan is calculated on the basis of the supplied azimuth as described above.

On the other hand, if the expected reference point is not detected in azimuth discriminating means 24, a missing signal is output, and corresponding included angle data is supplied from the included angle setting means 30 to azimuth prediction means 27 in response to the missing signal. In the azimuth prediction means 27, the azimuth of the reference point immediately before the missing reference point and the corresponding included angle are added to calculate the predicted azimuth of the missing reference point. The calculation of the predicted azimuth of a reference point is preferably performed right after the reference point disposed just before the missing reference point is detected in the next scan, using the latest data of the azimuth of the just before reference point. The included angle may not only be previously calculated and stored in the included angle setting means 30 but may also be calculated on the basis of the positional information of the traveling course stored in traveling course setting means 16 each time an azimuth is predicted.

Figure 8:
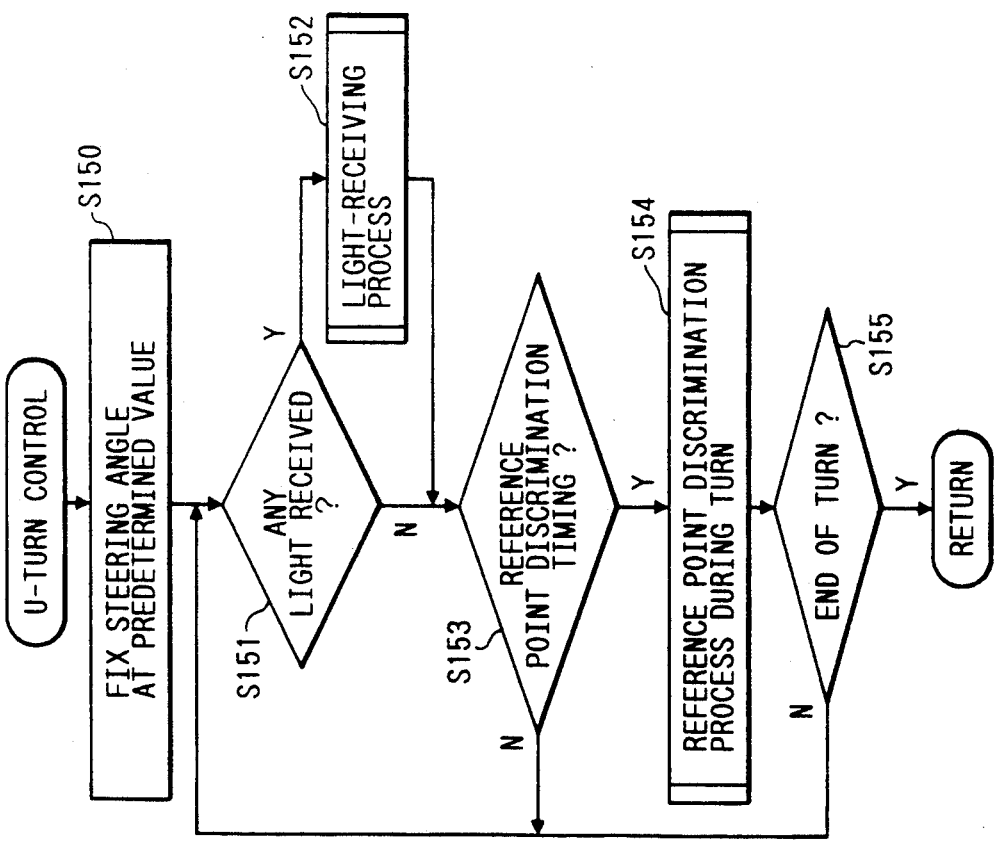
FIG. 8 is a flowchart of U-turn control of the moving vehicle.

Now, the U-turn control or the operation of the steering control during a turn is described. FIG. 8 is a flowchart for the U-turn control.

In step S150, the steering angle is fixed to a predetermined angle for the traveling in a turning course. In step S151, it is judged whether or not light beam receiver 3 has received light from a reference point or any other light source. If light has been received, the procedure goes to step S152 where the light receiving process is performed The light receiving process is similar to that shown in FIG. 7. If no light has been detected, step S153 is entered.

Figure 9:
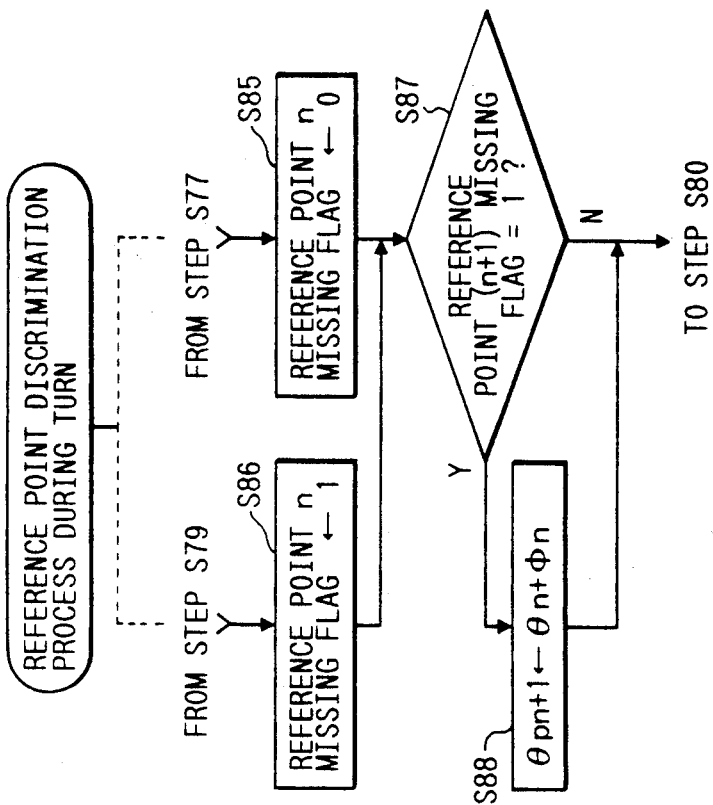
FIG. 9 is a flowchart of the reference point discrimination process in the turning course.

In step S153, to determine which one of the incident lights is light from the reference point as expected, it is judged whether or not it is time for the reference point discrimination process. This judgment is performed depending on whether or not the light beam scan has proceeded to one of the reference point discrimination azimuths pa-pc calculated in the azimuth prediction means 27. If the judgment in step S153 is positive, the reference point discrimination process during turn shown in the flowchart of FIG. 9 is executed. After the azimuth of the expected reference point is determined by the reference point discrimination process, the process goes to step S155.

In step S155, depending on whether or not the determined azimuth substantially coincides with the angle set in the predetermined angle setting means 31, it is judged whether or not the turn should be terminated and the straight traveling should be restored. If the judgment is positive, the process returns to step S16 of FIG. 5 and the steering control for the straight traveling course is again performed.

The reference point discrimination process during turn is not described with reference to FIG. 9. The reference point discrimination process during turn is equivalent to the reference point discrimination process shown in FIG. 6 with the following steps S85-S88 added between steps S77 and S79 and step S80.

In step S85 following the step S77, the detection of an expected reference point n is memorized by setting "0" in the reference point n missing flag. On the other hand, in step S86 following the step S79, the missing of a reference point n is memorized by setting "1" in the reference point n missing flag.

In step S87, according to the missing flag of the next reference point (n+1), it is judged whether or not the reference point (n+1) was detected in the last scan.

If the judgment is negative, the flow proceeds to step S80 where the next reference point discrimination direction pn+1 is calculated by adding a predetermined angle $\theta h$ to the azimuth $\theta pn+1$ of the next reference point detected in the last scan.

If the judgment in step S87 is positive, in step S88, a reference differential azimuth on $\phi n$ ($\phi 1 = \alpha U$, $\phi 2 = \beta U$, $\phi 3 = \gamma U$) is added to the azimuth $\theta n$ determined in step S77 or S79 (FIG. 6) to predict the azimuth $\theta pn+1$ in which the next reference point (n+1) is to be detected, and thereafter the flow goes to step S80.

As described above, in the reference point discrimination process during turn of this embodiment, the azimuth which is to be detected in the next scan is predicted by different approaches for the case where the expected reference point has been detected and the case where it has been missed. That is, if the expected reference point is detected, the azimuth is predicted on the basis of the azimuths detected in the last and current scans as in the straight traveling course. On the other hand, if the reference point has been missed, the predicted azimuth of the reference point which is to be detected in the next scan is determined by adding, at the time of discriminating the reference point disposed immediately before the missing reference point, in the next scan, a corresponding included angle to the azimuth of the preceding reference point. The predicted azimuth obtained in this way is used as a reference for determining the release timing of the steering angle for instance.

Although, in this embodiment, the steering angle is fixed in a turning course, the steering angle may be automatically controlled on the basis of the position of moving vehicle calculated during the turning rather than being fixed.

Figure 14:
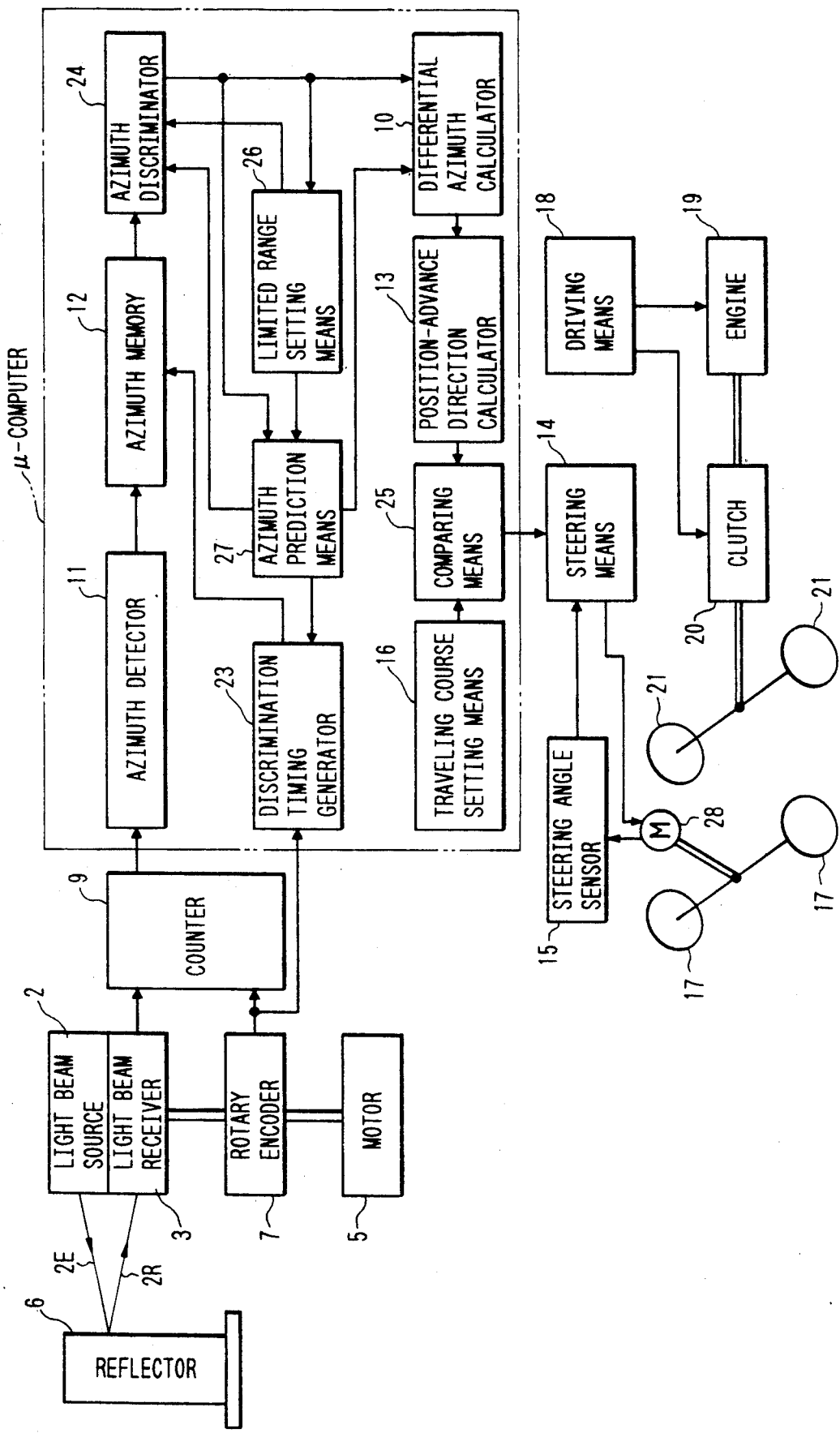
FIG. 14 is a block diagram showing another embodiment of the present invention.

FIG. 14 is a block diagram of the second embodiment of the present invention. The construction and operation of the second embodiment may easily be inferred from the description of the first embodiment referring to FIG. 1.

As apparent from the above description, the following advantages can be obtained by the present invention.

(1) Since the light reflected by the reflector disposed at a reference point can be discriminated from lights from other light sources, the adverse effect on the position detection of the moving vehicle by foreign light-reflecting objects or light-emitting sources in or around the work area can be eliminated.

(2) Since the position of the moving vehicle can be detected using the predicted azimuth even if a reference point has been temporarily missed, the traveling of the moving vehicle is not stopped but continued. Accordingly, the work by the vehicle can be continued even in an area in which the moving vehicle somewhat rolls or in an area which is very rough, the applications of the work by the moving vehicle can be extended.

(3) Even if a reference point has been missed in the turning course in which the rate of change in the azimuth of the reference point as viewed from the moving vehicle is fairly large, the azimuth of the reference point to be detected in the next scan is predicted on the basis of the azimuth of the other reference point detected immediately before and the corresponding included angle which may be accurately calculated and set beforehand, paying attention to the fact that the existing position itself of the moving vehicle does not substantially change in a turning course, and thus the prediction accuracy can be enhanced. In consequence, the steering angle which is fixed in the turning course can be accurately released at a predetermined turn position.

What is claimed is:

1. A steering control system for a moving vehicle wherein the position of the moving vehicle is detected by scanning a light beam generated at the moving vehicle in the circumferential direction around the moving vehicle and receiving light beams reflected by retroreflective means disposed at at least three reference points, the steering control system for the moving vehicle comprising:

azimuth detecting means for detecting the azimuth of each retroreflective means as viewed from the moving vehicle on the basis of incident light reflected by the retroreflective means during each scan, means for calculating a predicted azimuth of each retroreflective means to be detected in the next scan on the basis of the azimuths previously detected in the azimuth detecting means, means for setting a reference point discrimination direction for each direction at which the light beam scan has proceeded by a predetermined angle beyond the predicted azimuth of each retroreflective means, and azimuth discriminating means for judging that the incident light with a directional angle nearest the predicted azimuth of the incident lights detected between the preceding reference point discrimination direction and the current reference point discrimination direction is light reflected from the reflecting means disposed at the expected reference point.

2. A steering control system for a moving vehicle as set forth in claim 1 which further includes means for judging an incident light to be the light reflected by the retroreflective means disposed at the expected reference point, only when the incident light from an angle nearest the predicted azimuth is in a limited angle range provided on the basis of the predicted azimuth.

3. A steering control system for a moving vehicle as set forth in claim 2 which includes memory means for storing only the azimuths of lights detected in the limited angle range provided on the basis of and containing the predicted azimuth, and a reference point discrimination process is applied only on the azimuths stored in the memory means.

4. A steering control system for a moving vehicle as set forth in claim 1 wherein if no incident light is detected which can be judged to be light reflected y one of the reflecting means disposed at the expected reference points, the position of the moving vehicle is detected on the basis of the predicted azimuth.

5. A steering control system for a moving vehicle as set forth in claim 1, wherein the means for calculating a predicted azimuth of each retroreflective means to be detected in the next scan is means for calculating the predicted azimuth on the basis of the difference between the azimuths of the retroreflective means detected in the last and current scans.

6. A steering control system for a moving vehicle wherein a light beam generated at the moving vehicle is scanned in the circumferential direction around the moving vehicle, light beams reflected by retroreflective means disposed at at least three reference point are received to determine the azimuths of the retroreflective means as viewed from the moving vehicle, and based on the result of the determination, the moving vehicle is caused to travel in a traveling course consisting of straight courses and turning courses contiguous thereto, the steering control system comprising:

azimuth detecting means for detecting the azimuth of each retroreflective means as viewed from the moving vehicle on the basis of light reflected by the retroreflective means, first azimuth calculating means for calculating, on the basis of the azimuths previously detected in said azimuth detecting means, a predicted azimuth in which each retroreflective means is to be detected in the next scan, reference point discriminating means for detecting, on the basis of whether or not an incident light comes from the predicted azimuth, the light reflected by the expected retroreflective means from among the received incident lights, included angle calculating means for calculating included angles between mutually adjoining two straight lines of the straight lines connected each turn center in a preset traveling course and the respective retroreflective means, and second azimuth calculating means for adding, when a particular expected retroreflective means has not been detected at the predicted azimuth thereof in a turning course, the included angle formed by two straight lines connecting the turn center to the particular retroreflective means which has not been detected and another retroreflective means disposed immediately before in the scan direction to the azimuth of said another retroreflective means, thereby to calculate the azimuth of the undetected particular retroreflective means to be detected in the next scan.

7. A steering control system for a moving vehicle as set forth in claim 6 wherein the azimuth of said another retroreflective means being added is detected in the next scan.

8. A steering control system for a moving vehicle as set forth in claim 6 wherein said included angles are previously calculated by the included angle calculating means.

9. A steering control system for a moving vehicle as set forth in claim 8 which further includes means for judging an incident light to be the light reflected by the retroreflective means disposed at the expected reference point, only when the incident light from an angle nearest the predicted azimuth is in a limited angle range provided on the basis of the predicted azimuth.

10. A steering control system for a moving vehicle as set forth in claim 6 wherein the reference point discriminating means comprises means for setting a reference point discrimination direction for each direction at which the light beam scan has proceeded by a predetermined angle beyond a predicted azimuth of each retroreflective means, and azimuth discriminating means for judging that the incident light with a directional angle nearest the predicted azimuth of the incident light detected between the preceding reference point discrimination direction and the current reference point discrimination direction is the reflected light from the reflecting means disposed at the expected reference point.

11. A steering control system for a moving vehicle as set forth in claim 10 which includes memory means for storing only the azimuths of lights detected in the limited angle range provided on the basis of and containing the predicted azimuth, and a reference point discrimination process is applied only on the azimuths stored in the memory means.

12. A steering control system for a moving vehicle as set forth in claim 6 which further includes fixed steering release means for causing the moving vehicle to travel with a predetermined fixed steering angle in a turning course and for releasing the fixed steering angle when at least one of the azimuths of the individual retroreflective means as viewed from the moving vehicle has substantially coincided with the corresponding azimuth.

* * * * *